United States Patent
Nieminem

(10) Patent No.: US 9,032,448 B2
(45) Date of Patent: *May 12, 2015

(54) SYSTEM AND METHOD FOR BROADCASTING ADVERTISEMENTS AND REWARDING THE CONSUMPTION OF THE ADVERTISEMENTS

(75) Inventor: Ari Nieminem, Motala (SE)

(73) Assignee: Vringo Infrastructure Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,003

(22) Filed: Sep. 14, 2012

(65) Prior Publication Data

US 2013/0014183 A1    Jan. 10, 2013

Related U.S. Application Data

(63) Continuation of application No. 11/165,994, filed on Jun. 24, 2005, which is a continuation of application No. 09/752,127, filed on Dec. 29, 2000, now Pat. No. 6,961,953.

(51) Int. Cl.
| | | |
|---|---|---|
| *H04N 5/445* | (2011.01) | |
| *H04N 7/10* | (2006.01) | |
| *G06Q 30/00* | (2012.01) | |
| *H04N 21/81* | (2011.01) | |
| *H04N 21/431* | (2011.01) | |
| *H04N 21/4725* | (2011.01) | |
| *G06Q 30/02* | (2012.01) | |
| *H04H 20/30* | (2008.01) | |
| *H04H 20/33* | (2008.01) | |
| *H04N 7/00* | (2011.01) | |
| *H04N 7/08* | (2006.01) | |
| *H04N 7/173* | (2011.01) | |
| *H04N 21/2543* | (2011.01) | |
| *H04N 21/41* | (2011.01) | |
| *H04N 21/433* | (2011.01) | |
| *H04N 21/44* | (2011.01) | |
| *H04N 21/475* | (2011.01) | |
| *H04N 7/16* | (2011.01) | |
| *G06F 3/00* | (2006.01) | |
| *G06F 13/00* | (2006.01) | |
| *H04H 60/91* | (2008.01) | |

(52) U.S. Cl.
CPC ......... *H04N 21/812* (2013.01); *H04N 21/4316* (2013.01); *H04N 21/4725* (2013.01); *G06Q 30/0241* (2013.01); *G06Q 30/0207* (2013.01); *G06Q 30/0272* (2013.01); *H04H 20/30* (2013.01); *H04H 20/33* (2013.01); *H04H 60/91* (2013.01); *H04N 7/002* (2013.01); *H04N 7/08* (2013.01); *H04N 7/17318* (2013.01); *H04N 21/25435* (2013.01); *H04N 21/4126* (2013.01); *H04N 21/4331* (2013.01); *H04N 21/44016* (2013.01); *H04N 21/4758* (2013.01)

(58) Field of Classification Search
CPC .......... G06Q 30/0241; G06Q 30/0251; H04N 21/4316; H04N 21/4725; H04N 21/812
USPC ....... 725/22, 23, 32, 42, 51, 60, 61; 705/14.4, 14.49, 14.55
See application file for complete search history.

(56) References Cited

U.S. PATENT DOCUMENTS

| 4,814,883 A | 3/1989 | Perine et al. |
|---|---|---|
| 5,671,267 A | 9/1997 | August et al. |

(Continued)

FOREIGN PATENT DOCUMENTS

WO    WO-9853611    * 11/1998    ............... H04H 1/00

*Primary Examiner* — Hoang-Vu A Nguyen-Ba
(74) *Attorney, Agent, or Firm* — Cozen O'Connor

(57) ABSTRACT

A broadcast system provides consumers with inducement to consume portions in which they may not have an active interest, such as commercials. To dissuade consumers from leaving the vicinity of the broadcast receiver or from switching to other broadcasts while a first broadcast airs such a portion, the first broadcast is augmented by a second content entity calculated to be of interest to the consumer. Interaction is required of the consumer in order for him to receive the second content entity, which necessitates his presence and attention.

17 Claims, 4 Drawing Sheets

(56) References Cited

U.S. PATENT DOCUMENTS

| | | |
|---|---|---|
| 6,057,872 A | 5/2000 | Candelore |
| 6,529,878 B2 | 3/2003 | De Rafael et al. |
| 6,553,178 B2 | 4/2003 | Abecassis |
| 6,944,585 B1 | 9/2005 | Pawson |
| 7,146,627 B1 * | 12/2006 | Ismail et al. .................... 725/47 |
| 7,490,344 B2 | 2/2009 | Haberman |
| 7,788,687 B1 * | 8/2010 | Conrad et al. .................. 725/36 |
| 2002/0010927 A1 | 1/2002 | Kim |
| 2002/0083435 A1 | 6/2002 | Blasko et al. |
| 2003/0067554 A1 * | 4/2003 | Klarfeld et al. ............... 348/461 |
| 2003/0163832 A1 * | 8/2003 | Tsuria et al. .................. 725/135 |
| 2006/0015904 A1 * | 1/2006 | Marcus .......................... 725/46 |
| 2006/0282319 A1 * | 12/2006 | Maggio ........................... 705/14 |
| 2007/0061845 A1 | 3/2007 | Barnes |
| 2007/0277201 A1 | 11/2007 | Wong |

\* cited by examiner

SYSTEM AND METHOD FOR BROADCASTING ADVERTISEMENTS AND REWARDING THE CONSUMPTION OF THE ADVERTISEMENTS

CROSS REFERENCE TO RELATED APPLICATIONS

This application is a continuation of U.S. patent application Ser. No. 11/165,994 which was filed with the U.S. Patent and Trademark Office on Jun. 24, 2005 which is a continuation of an application filed in US on Dec. 29, 2000, Ser. No. 09/752,127, the entirety of which are incorporated by reference.

BACKGROUND OF THE INVENTION

1. Field of the Invention

The present invention relates to program and/or content transmission, and particularly to inducing a consumer of program and/or content transmission to continue to receive and consume program and/or content transmission during portions thereof in which he is not actively interested and which he is inclined to ignore.

2. Description of the Related Art

Broadcast industries, such as radio broadcasting and television broadcasting, derive a substantial portion of their income from charging advertisers for interspersing commercial messages ("commercials"), also known as advertisements ("ads"), into the substantive content of the broadcasts. Such advertising revenue not only provides profit for the broadcasters, but typically provides funds for operating expenses. Much broadcasting would have to be discontinued without advertising revenue.

The viewer of a television program or the listener to a radio program (hereinafter referred to as the user or consumer of programming) typically is not actively interested in the commercial, and may even perceive the commercial as an intrusion or annoyance. The user may leave the room, in which case he is still receiving, but is no longer consuming, the program. Or the user may switch to another program while the commercial is being broadcast. Modern consumer electronics devices are typically equipped with remote controls which make it a simple matter to switch to another program or "channel surf" through a plurality of other programs, and to switch back to the original program when it is adjudged that the commercials should be over. Some consumer electronics devices facilitate recording a program for delayed playback, often with the commercials "cut". Even if the commercials are not cut, the consumer may be inclined to "fast forward" over them. Such behavior reduces the size of the audience for commercials, which in turn eventually lowers the amount that the advertisers are willing to pay the broadcasters for airing them. In effect, such behavior threatens the economic basis of commercial broadcasting.

There is thus a need to provide an incentive or inducement to the consumer to continue to consume the programming even when the substantive content is interrupted for the presentation of commercial messages.

SUMMARY OF THE INVENTION

To overcome limitations in the prior art described above, and to overcome other limitations that will be apparent upon reading and understanding the present specification, the present invention provides program material and/or content that contains along with the signal conveying the commercial message another signal conveying something of interest or immediate benefit to the user, thus inducing the user to continue receiving and consuming the program material including the commercial message. The user is required to provide an interactive response in order to receive the additional signal. He is thus induced to continue to consume the programming and/or content, including the commercial message. In an aspect of the invention, the two signals are transmitted via two different transmission media. In another aspect of the invention, the additional signal is sent in advance of the commercial message and is stored in the receiving equipment until the commercial is broadcast.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements.

DETAILED DESCRIPTION OF THE PRESENTLY PREFERRED EMBODIMENTS

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
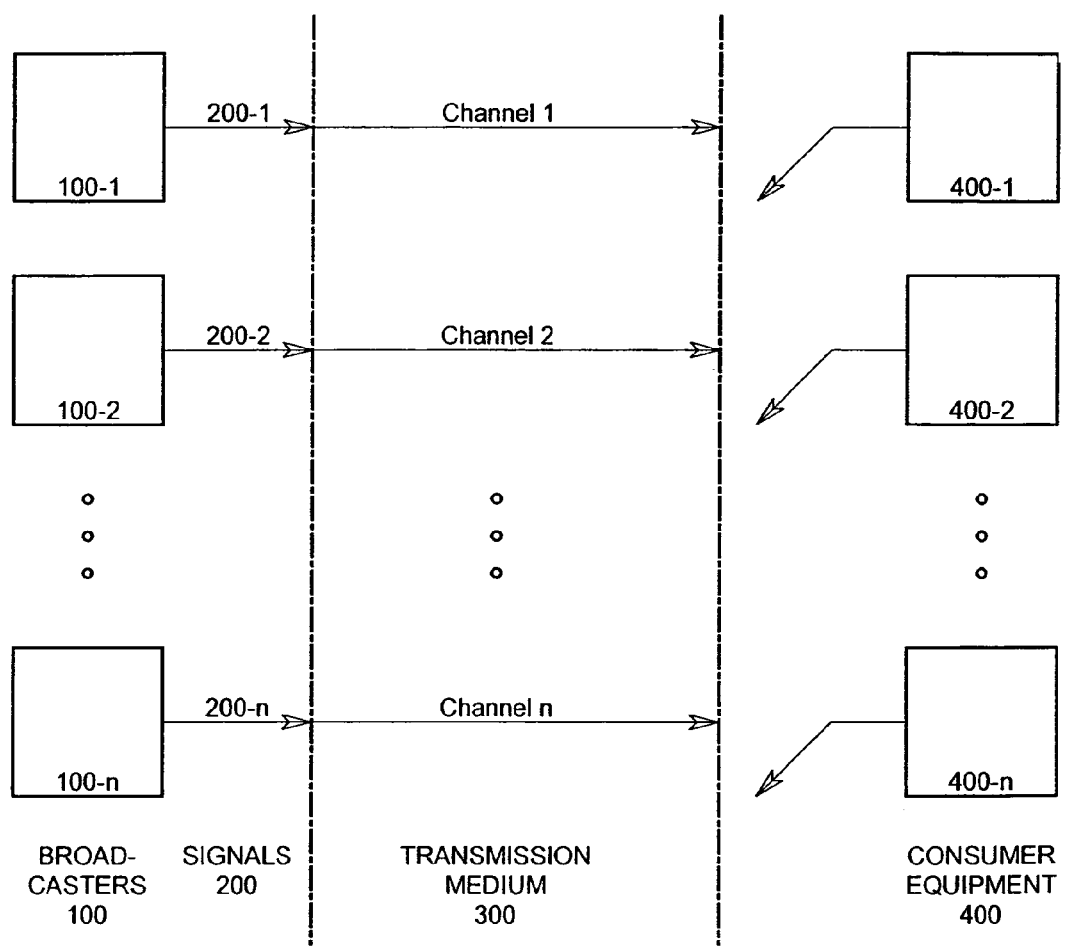
FIG. 1 is a high-level block diagram of a prior-art broadcasting system in which the present invention may be practiced.

FIG. 1 is a high-level block diagram of a prior art broadcast system in which the present invention may be practiced. A plurality of broadcasters 100 are providing a plurality of signals 200 to transmission medium 300. Each broadcaster is assigned a channel. Transmission medium 300 includes wired and wireless links, including without limitation radio-frequency links, cable networks, the Internet, satellite facilities, and telephone networks. Transmission may be in digital or analog form. In a digital television system, several virtual channels can be on the same MPEG transport stream, appearing as separate packages. A plurality of consumers, each equipped with consumer equipment 400, may each selectively receive any of signals 200 from transmission medium 300 by selecting the corresponding channel. In a present example, broadcasters 100 are television broadcasters and consumer equipment 400 are television receiving equipment. Consuming a broadcast in this example comprises viewing a video portion and listening to an associated audio portion. It is to be understood that the invention is not limited to television broadcasting but may also be practiced in other types of transmission systems, such as streaming video broadcast over the Internet.

Figure 2:
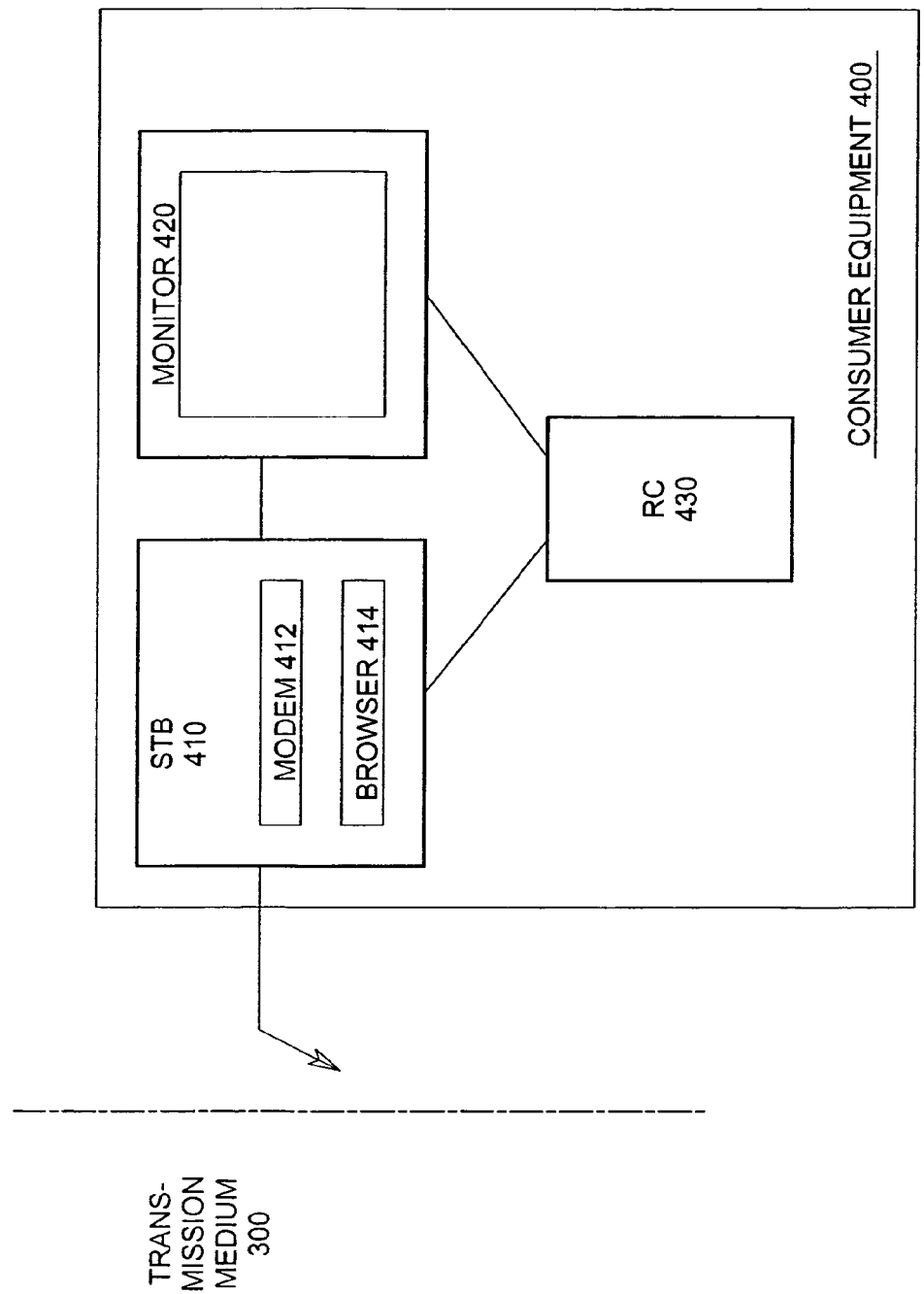
FIG. 2 is a high level block diagram of prior-art consumer equipment 400 shown in FIG. 1.

FIG. 2 is a high-level block diagram of an exemplary known consumer equipment 400. A set-top box (STB) 410 is connected to transmission medium 300 and may select any channel therefrom for presentation on television receiver or monitor 420. It is to be understood that the term "set-top box" (also known as an integrated receiver decoder or IRD) is a term of art generally denoting a unit for front-ending a receiving monitor or television set, and is not necessarily constrained to being housed in a separate box nor to being located literally on top of monitor 420. In some embodiments, STB 410 is Internet enabled, and thus includes a modem 412 and an Internet browser 414, which are used when the Internet is used as transmission medium 300. Remote control (RC) 430 is typically provided for controlling STB 410 and monitor 420 from the consumer's location, typically a convenient seating location in the same room. RC 430 typically facilitates such functions as channel selection, adjusting audio volume, and the like, and is equipped with a complement of pushbuttons.

Figure 3:
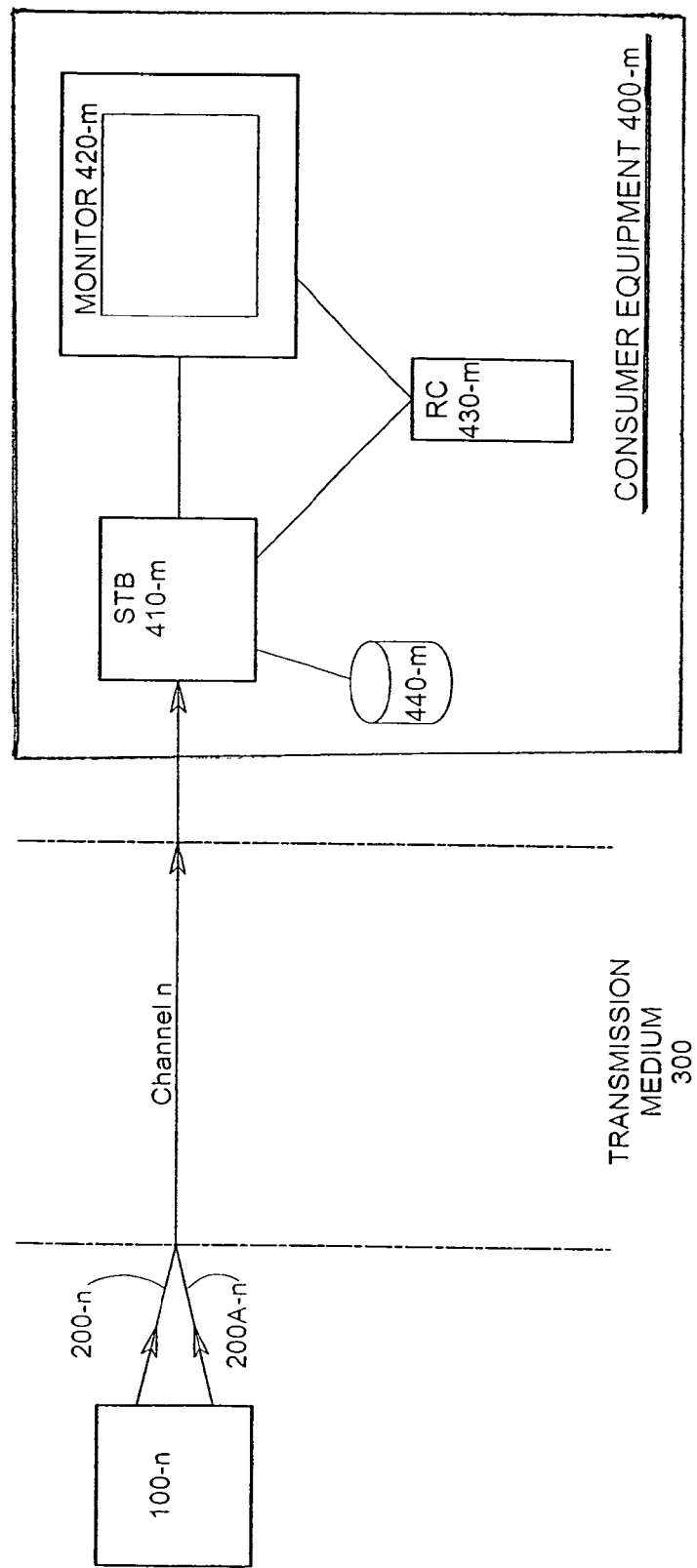
FIG. 3 is a block diagram of a broadcasting system according to one embodiment of the invention.

In accordance with one embodiment of the present invention, FIG. 3 illustrates a scenario in which the present invention is being practiced. A particular one of consumer equipment 400, denominated 400-m, is receiving the signal from a particular one of broadcasters 100, denominated broadcaster 100-n, by virtue of selecting channel n.

Signal 200-n from broadcaster 100-n may include material in which the consumer is not actively interested, such as commercials. At the inception of a commercial, the consumer may be inclined to leave the consumer equipment 400-m for a time, or to select some other channel, thus directing reception of some other signal 200 from some other broadcaster 100. Yet the broadcaster 100-n has a keen economic interest in dissemination of the commercials to as many consumers as possible. According to the invention, additional content is provided to the consumer which may engage his interest, presented in such a manner as to require interaction from the consumer which thus necessitates his continued reception of the signal 200-n and his continued consumption of it, including the commercial. According to the invention, the signal on channel n comprises a second portion. Signal 200-n contains the normal programming from broadcaster 100-n, including commercials. Signal 200-n is received and handled by all consumer equipment 400 which have selected channel n, including those which are not practicing the invention. Also transmitted on channel n is signal 200A-n.

In one aspect of the invention, signal 200A-n is not transmitted constantly, but only in conjunction with commercials on signal 200-n. In an aspect of the invention, signal 200A-n is transmitted in advance of a commercial on signal 200-n and stored in consumer equipment 400-m for use when the commercial is transmitted on signal 200-n. In an alternative embodiment, signal 200A-n is transmitted on another channel (not illustrated) from broadcaster 100-n to consumer equipment 400-m. The other channel may be the Internet if STB 410 is Internet enabled. Signal 200A-n contains additional content determined by broadcaster 100-n to be of greater interest to the consumer than the commercial is. Signal 200A-n may also contain instructions to be interpreted by STB 410-m for accepting interaction from the consumer. If the consumer supplies a predetermined interaction, the content in signal 200A-n is handled in a manner that provides some benefit to the user. In one aspect of the invention, the content in signal 200A-n is an audio signal (compressed, e.g. in MP3 format) containing an entertainment entity such as a popular song; the consumer may be presented with a video or audio prompt such as, for example: "Press 1 to record latest Elton John song"; STB 410-m, upon recognizing that the consumer has pressed the "1" button on RC 430-m, directs recording of the audio signal for later access by the consumer.

A consumer who has left the room or selected another channel at the inception of the commercial in signal 200-n forfeits the ability to receive the free recording of the song in signal 200A-n. While recording is taking place, the commercial in signal 200 is still being received. In an aspect of the invention, recording ceases if the consumer endeavors to lower the audio portion of the commercial in signal 200. In another aspect of the invention, the consumer is prompted to interact periodically (e.g., every 20 seconds) during recording, and recording ceases if the consumer fails to do so, as would occur if he has left the room. The repeated interactions could be presented in the guise of a game in order to ease their perceived intrusiveness. Through these interactions the consumer is induced to continue consumption of the programming and/or content in signal 200, including the commercial which he might otherwise have elected to shun.

In a consumer equipment 400 for practicing the invention, STB 410 is provided with capabilities greater than those required for consuming only a signal 200 as in the prior art. STB 410-m includes logic for interpreting interaction instructions provided in conjunction with signal 200A and for ascertaining that the consumer has interacted in the prescribed manner. STB 410-m includes storage means for recording content of signal 200A. In the embodiment pictured in FIG. 3 this is a disk drive 440-m. In alternative embodiments, the recording means may include, without limitation, semiconductor memory devices and other magnetic-medium recording devices such as tape devices. The content portion of a signal 200A is not constrained to being a musical selection, nor any form of entertainment entity, but might also be, without limitation, a video signal, a non-musical audio signal, or any form of textual or graphic information conveyed in a datastream, such as a computer program, a computer game, or an e-book or portion thereof. The content portion of signal 200A may be recorded for later use, or may have some immediate effect such as being displayed on monitor 420, superimposed on the content of signal 200, for example as "picture-in-picture".

In another aspect of the invention, signal 200A-n contains only a portion of a content entity. A succession of such portions are provided in signals 200A-n in conjunction with a series of commercials in signal 200-n. A consumer is thus induced to consume all the commercials in a series of commercials, which may be separated over the span of several days or even several weeks, in order to obtain all the associated portions of a content entity. STB 410-m is equipped with logic to assemble the portions into the complete content entity. The invention thus provides the ability to assemble long, and therefore valuable, reward entities for the user. This enhances the ability of the broadcaster to induce the customer to view commercials.

In still another aspect of the invention, the content in signal 200A is arranged to cause the consumer to view or hear gaming components and/or instructions, superimposed on the video or audio of signal 200. Such a game could be a simple graphic game on the order of tic-tac-toe, or a series of clues that lead the consumer in some way to progress through a series of steps, perhaps toward the goal of increasing the consumer's chances of winning a contest, and the like.

Signal from a channel on transmission medium 300 recorded by the user for later playback on a recording device such as a video cassette recorder (VCR, not shown) includes signal 200A-n. The inducements provided according to the present invention may apply whether a consumer receives programs "off the air" or in a delayed manner via his VCR. He is thus induced not to set his VCR to cut the commercials and not to fast forward over them.

Figure 4:
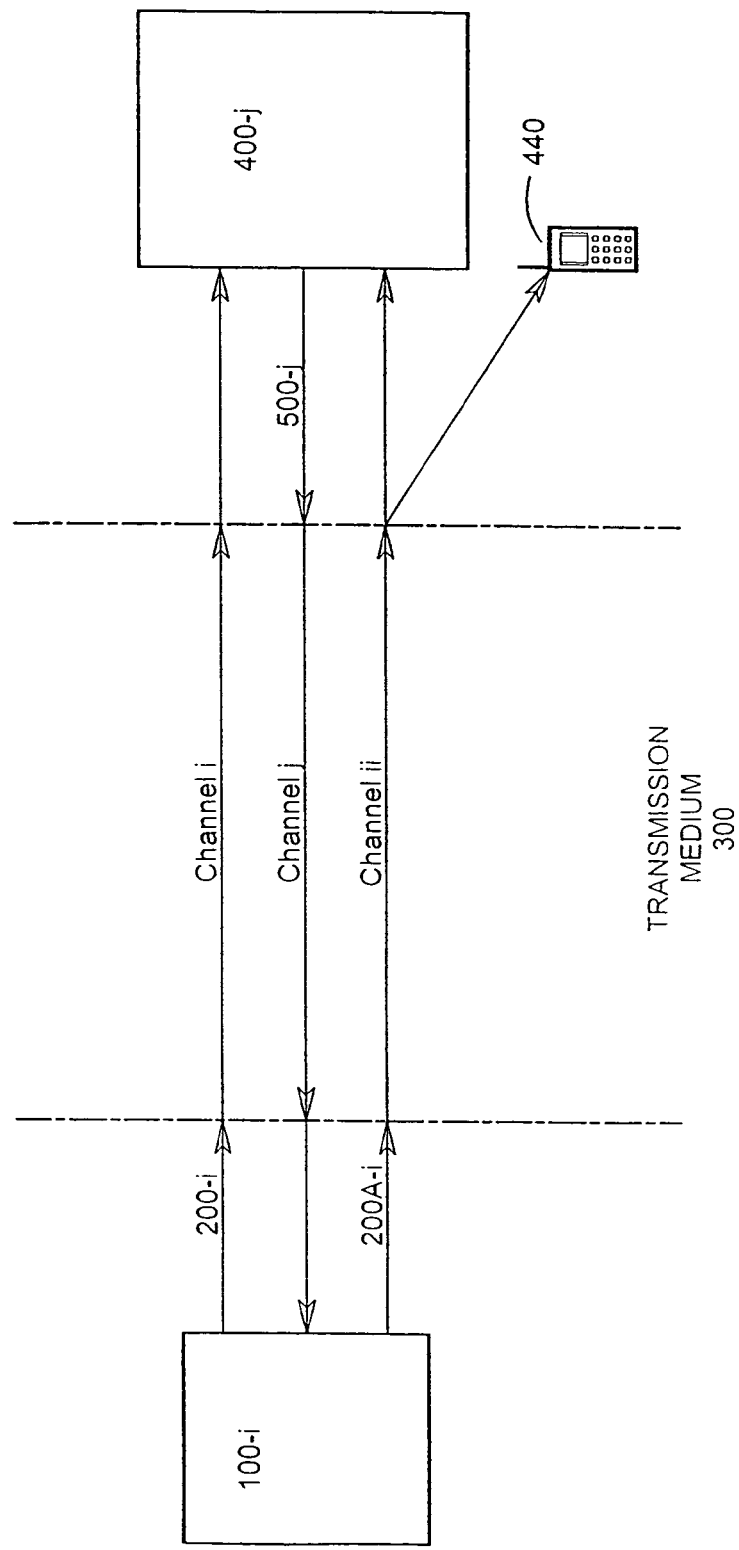
FIG. 4 is a block diagram of a broadcasting system according to another embodiment of the invention.

Another embodiment of the invention is depicted in FIG. 4. This embodiment is best suited to be practiced in environments where transmission medium 300 comprises digital links, such as used in conjunction with General Packet Radio Services (GPRS), the Universal Mobile Telecommunications System (UMTS), the Advanced Television Enhancement Forum (ATVEF), or the Multimedia Home Platform (MHP). FIG. 4 exemplarily illustrates a particular one of user equipment 400, designated 400-j, receiving signal from a particular one of broadcasters 100, designated 100-i. Such an environment typically provides two-way communication, in which a user equipment 400-j not only receives signal from a broadcaster 100-i over channel i, but may also send signals 500-j back to broadcaster 100-i over channel j. This is best suited to an environment where channel j is not necessarily a dedicated frequency channel, but rather is a virtual channel created by virtue of routing digital data over a digital network from consumer equipment 400-j to broadcaster 100-i. In this embodiment, signal 200A-i is sent separately from signal 200-i, after STB 410-j (not shown in FIG. 4) determines that the consumer has responded appropriately to the prescribed interactions and signaled broadcaster 100-i accordingly with signal 500-j. In an aspect of the invention signal 200A-i is sent over a separate channel (channel ii, again a virtual channel according to the routing of digital packets collectively containing the content of signal 200A-i). In another aspect of the invention, signal 200A-i is sent on channel i along with signal 200-i, after receiving request 500-j.

In another aspect of the invention, signal 200A-n (FIG. 3) or signal 200A-i (FIG. 4) is transmitted at any time that it is convenient to do so, perhaps in advance of the associated commercial. Transparently to the consumer, it is received and stored by STB 410, and takes effect when broadcaster 100 sends an activation code (as part of signal 200A). This aspect is well suited to be practiced in conjunction with an ATVEF broadcasting environment. Under this aspect, no signal need be transmitted back to broadcaster 100-i; the user's interaction signal from RC 430 need only go as far as STB 410 to invoke the stored content 200A.

In another aspect of the invention, suited to be practiced when transmission medium 300 comprises GPRS or UMTS, user equipment 400 further includes a handset 440. In this aspect, signal 200A-i may be received and processed by handset 440.

Typically, a string of several commercials is broadcast during a "commercial break" in a program. If the consumer is informed that one of them will contain the inducement according to the present invention, but if he is not informed which one, he is induced to consume all the commercials in the string, or at least all the ones up to the point where he avails himself of the inducement.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A method for broadcasting a service, comprising:
   transmitting a first information stream comprising first consumable content for consumption by a user;
   simultaneously transmitting a second information stream with a predetermined portion of the first information stream comprising a first portion for interaction with a user and a second portion comprising second consumable content for consumption by the user;
   monitoring an activity of the user with respect to consuming the first consumable content; and
       allowing the user to consume the second consumable content in response to the monitored activity when the first consumable content is consumed and
       denying the user access to the second consumable content in response to the monitored activity when the first consumable content is not consumed.

2. The method of claim 1, wherein the user activity comprises selecting an option to consume the second consumable content.

3. The method of claim 1, wherein the user activity comprises consuming the first consumable content.

4. The method of claim 3, further comprising allowing the user to consume the second consumable content.

5. The method of claim 1, wherein the user activity comprises varying a manner in which the first consumable content is consumed.

6. The method of claim 5, further comprising denying the user access to the second consumable content in response to the monitored activity.

7. The method of claim 1, wherein the first consumable content is an advertisement.

8. The method of claim 1, wherein the second consumable content is provided in a plurality of segments.

9. A method for receiving a content by a user, comprising:
   receiving a first requested information stream comprising first consumable content for consumption;
   simultaneously receiving a second information stream with a predetermined portion of the first information stream comprising a first portion for interaction with a user and a second portion comprising second consumable content for consumption;

monitoring an activity of the user with respect to consuming the first consumable content; and
  allowing consumption of the second consumable content in response to the monitored activity when the first consumable content is consumed and
  denying consumption of the second consumable content in response to the monitored activity when the first consumable content is not consumed.

10. The method of claim 9, wherein the user activity comprises selecting an option to consume the second consumable content.

11. The method of claim 10, wherein the first consumable content is an advertisement.

12. The method of claim 9, wherein the user activity comprises consuming the first consumable content.

13. The method of claim 12, further comprising allowing the user to consume the second consumable content.

14. The method of claim 9, wherein the user activity comprises varying a manner in which the first consumable content is consumed.

15. The method of claim 14, further comprising denying the user access to the second consumable content in response to the monitored activity.

16. The method of claim 9, wherein the second consumable content is provided in a plurality of segments.

17. A user device, comprising:
  a receiver configured to receive a first requested information stream comprising first consumable content for consumption and simultaneously receive a second information stream with a predetermined portion of the first information stream comprising a first portion for interaction with a user and a second portion comprising second consumable content for consumption; and
  a monitor configured to monitor an activity of a user of the device with respect to consuming the first consumable content,
  wherein the device is configured to:
    allow consumption of the second consumable content in response to the monitored activity when the first consumable content is consumed and
    deny consumption of the second consumable content in response to the monitored activity when the first consumable content is not consumed.

* * * * *